United States Patent [19]

Kawanami et al.

[11] Patent Number: 5,896,563
[45] Date of Patent: Apr. 20, 1999

[54] TRANSMITTING AND RECEIVING SWITCH COMPRISING A CIRCULATOR AND AN AUTOMATIC CHANGEOVER SWITCH WHICH INCLUDES AN IMPEDANCE CIRCUIT

[75] Inventors: Takashi Kawanami, Ishikawa-ken; Takashi Hasegawa, Nagaokakyo, both of Japan

[73] Assignee: Murata Manufacturing Co., Ltd., Japan

[21] Appl. No.: 08/719,391

[22] Filed: Sep. 24, 1996

Related U.S. Application Data

[63] Continuation-in-part of application No. 08/638,701, Apr. 26, 1996.

[30] Foreign Application Priority Data

Apr. 27, 1995 [JP] Japan .................................. 7-104024

[51] Int. Cl.$^6$ ................................................. H04B 1/48
[52] U.S. Cl. .......................... 455/82; 455/83; 333/1.1; 333/104
[58] Field of Search ............................ 455/78, 79, 80, 455/81, 82, 83; 333/1.1, 101, 103, 104, 102

[56] References Cited

U.S. PATENT DOCUMENTS

| | | | |
|---|---|---|---|
| 4,380,822 | 4/1983 | Broton | 455/82 X |
| 4,641,365 | 2/1987 | Montini, Jr. | 455/78 |
| 5,129,099 | 7/1992 | Roberts | 333/1.1 X |
| 5,444,864 | 8/1995 | Smith | 455/78 X |
| 5,507,011 | 4/1996 | Chigodo et al. | 455/83 |
| 5,513,382 | 4/1996 | Agahi-Kesheh et al. | 455/83 |

*Primary Examiner*—Wellington Chin
*Assistant Examiner*—Philip J. Sobutka
*Attorney, Agent, or Firm*—Ostrolenk, Faber, Gerb & Soffen, LLP

[57] ABSTRACT

A transmitting and receiving apparatus including a transmitting system and a receiving system which prevents fluctuations in insertion losses caused by changes in transmission power, while obviating the need for the provision of a battery and a current control circuit for providing a switching current, and suppresses losses in the transmission system so as to improve the power efficiency, and also decreases the cost of parts. The transmitting and receiving apparatus having a transmitter and a receiver sharing a single antenna is configured as follows. A circulator is provided at a feed point of the antenna between the transmitting system and the receiving system. Also, a changeover switch is disposed between a terminating resistor connected to ground and a point where the circulator and the receiver are connected so that the changeover switch can be automatically switched to the terminating resistor in response to input power supplied from the transmitter during transmission.

21 Claims, 8 Drawing Sheets

TRANSMITTING AND RECEIVING SWITCH COMPRISING A CIRCULATOR AND AN AUTOMATIC CHANGEOVER SWITCH WHICH INCLUDES AN IMPEDANCE CIRCUIT

CROSS-REFERENCE TO RELATED APPLICATION

This is a continuation-in-part of application Ser. No. 08/638,701 filed Apr. 26, 1996, now pending.

BACKGROUND OF THE INVENTION

1. Field of the Invention

The present invention relates to a transmitting and receiving apparatus wherein an antenna is shared by a transmission system and a receiving system, and more particularly to an automatic switching arrangement for interconnecting the transmission system, the receiving system, and the antenna.

2. Description of the Related Art

In the field of mobile communications, a transmitting and receiving apparatus is used in which a single antenna is shared by its transmitting and receiving systems. In this type of apparatus, a switching or duplexing method is employed for separating the transmitting and receiving systems to avoid mixing the transmitted and received signals.

FIG. 7 is a schematic diagram of a conventional transmitting and receiving apparatus including digital communication equipment using the time division multiple access (TDMA) and time division duplex (TDD) systems. In this transmitting and receiving apparatus generally indicated by 20, a changeover switch 22 is disposed in the feed line to a single antenna 21, and is connected to a transmitter 23 and a receiver 24, whereby the antenna 21 can be connected to either the transmitter 23 or the receiver 24 through the switch 22. Also, an isolator 25 is connected between the switch 22 and the transmitter 23 for preventing the generation of intermodulation (IM) due to reflection of a transmitted signal as well as for avoiding unstable operation of a power amplifier (PA) caused by load fluctuations.

FIG. 8 is a circuit diagram of the changeover switch 22. The switch 22 includes coupling capacitors C1 to C3 and a high-frequency short-circuiting capacitor C4. A ¼-wavelength high-impedance line L1 is short-circuited at one end by the capacitor C4 at high frequencies, thus making the impedance of the input terminal of switching power viewed from the other end P1 infinite and resulting in the input terminal being in an open state at high frequencies. The switch 22 also has diodes D1 and D2 and a ¼-wavelength stripline L2 having characteristic impedance ZO which is equal to a circuit impedance, generally 50 Ω.

An explanation will now be given of the transmitting and receiving operation of the changeover switch 22. In the transmitting operation, a switching current is allowed to flow through the switch 22 so as to turn on the diodes D1 and D2. This causes a point P3 to be short-circuited to ground through the diode D2, whereby a portion of the circuit viewed from a point P2 at one end of the stripline L2 toward the receiving circuit has an infinite impedance and is in an open state at high frequencies. On the other hand, since the points P1 and P2 are short-circuited to each other through the diode D1, a transmitted signal from the transmitting circuit is radiated from the antenna 21. This transmitted signal is partially absorbed in the isolator 25, thereby preventing the IM generation and unstable PA operations.

In a receiving operation, the switching current is discontinued to turn off the diodes D1 and D2. Accordingly, the points P1 and P2 are disconnected from each other by the diode D1, and the point P3 is disconnected from ground by the diode D2. Thus, a received signal input through the antenna 21 can be completely conducted to the receiving circuit.

However, the transmitting and receiving apparatus of the above conventional type requires a battery for providing a switching current in order to switch between the transmitting and receiving operations and also requires a current control circuit. This deteriorates the power efficiency of the transmitting and receiving apparatus and also shortens battery life. Further, the provision of a current control circuit inevitably enlarges the overall apparatus and increases its cost. There is also a problem of low reliability in the performance of the apparatus, for example, since any erroneous operation of the current control circuit renders the apparatus inoperable.

A measure that has been considered but has not yet been published or patented, to overcome the above-described drawbacks inherent in the conventional apparatuses, may be the use of a changeover switch 30 as illustrated in FIG. 9 for automatically switching between the transmitting and receiving systems depending on an output voltage of a transmitting signal. The switch 30 includes diodes D3 to D6 and a ¼-wavelength stripline L3 having characteristic impedance Z0. This switch 30 takes advantage of the fact that the transmitting power is greater than the receiving power. For example, in the Personal Handyphone System (PHS), the peak receiving power is several dozens of µW, while the transmitting power is approximately 100 mW.

The transmitting and receiving operation of the switch circuit of FIG. 9 will now be explained in connection with its application to the PHS system by way of example.

During a transmitting operation, a high-frequency signal having approximately 100 mW of power is outputted. By the use of diodes that are turned on by 10 mW of power, a, the diodes D3 to D6, one of the diodes D3 and D4 or one of the diodes D5 and D6 is accordingly turned on when the transmitted signal exceeds 10 mW. Which diodes are on, from among diodes D3 or D4, and D5 or D6, depends on the polarity of the voltage: a positive voltage turns on the diodes D3 and D5, while a negative voltage turns on the diodes D4 and D6. At this time, a branch point P4 and the terminal of the transmitting circuit are electrically connected through the diodes D3 and D4 at high-frequencies. A point PX is short-circuited to ground through the diodes D5 and D6 so that the impedance of a portion viewed from the point P4 to the receiving circuit can be infinite, thus resulting in this portion being in an open state. Hence, a transmitted signal is mostly radiated from the antenna, and partially reflected by the antenna and absorbed in the isolator before returning to the transmitting circuit.

On the other hand, during a receiving operation, all the diodes D3 to D6 are turned off, since the receiving power inputted from the antenna is only several dozens of µW. Thus the point P4 is disconnected from the terminal of the transmitting circuit by the diodes D3 and D4 and also the point P5 is disconnected from ground by the diodes D5 and D6. Accordingly, a received signal inputted from the antenna can be completely sent to the receiving circuit.

In this manner, the configuration of the changeover switch 30 makes it possible to eliminate the need for the provision of a battery and a current control circuit for providing a switching current. This improves the power efficiency of the transmitting and receiving apparatus, thereby avoiding an increase in the size and cost of the apparatus, as well as enhancing the reliability of its performance.

Diodes have different signal passing characteristics depending on input power; in general, a larger amount of power passing through a diode decreases its insertion loss (I. L.). In the foregoing conventional changeover switch 22, however, since a large amount of power is supplied from a battery, the I. L. is substantially constant regardless of the power of a transmitted signal. However, if automatic switching is performed according to the power of the transmitted signal, as in the changeover switch 30, the I. L. is susceptible to varying, and more specifically, a smaller amount of power increases the I. L., thereby causing a degradation in the performance of the overall apparatus.

Moreover, whichever switch 22 or 30 is used, a signal passes through the switch during a transmitting operation, which increases losses in the transmission system and further degrades the power efficiency. A switch having high isolation characteristics is also required for switching between the transmitting and receiving systems, thereby increasing the cost of parts.

SUMMARY OF THE INVENTION

Accordingly, in view of the above background, it is an object of the present invention to provide a transmitting and receiving apparatus which does not have fluctuations in insertion losses caused by changes in transmission power, which does not require the provision of a battery and a current control circuit for providing a switching current so as to improve its reliability, which has reduced losses in its transmission system so as to enhance its power efficiency, and which has lower-cost parts.

In order to achieve the above objects, according to an aspect of the present invention, there is provided a transmitting and receiving apparatus including a transmitter and a receiver that share a single antenna, comprising: a circulator disposed for interconnecting the transmitter, the receiver, and the antenna; a terminating resistor provided between ground and a point where the circulator and the receiver are connected; and a changeover switch disposed between the terminating resistor and the above point of connection so that it automatically connects the circulator to the terminating resistor in response to input power supplied from the transmitter during transmission.

Another aspect of the invention relates to a changeover switch for use in the above transmitting and receiving apparatus.

In a transmitting and receiving apparatus according to an embodiment of the present invention, a circulator is disposed at the branch portion of the antenna, and also, a changeover switch is provided between the terminating resistor and a point where the circulator and the receiver are connected so that it can be automatically switched to connect the circulator to the terminating resistor in response to transmission power. This obviates the need for the provision of a battery and a current control circuit for providing a switching current, as has been conventionally required, thereby improving the power efficiency and reliability of the overall transmitting and receiving apparatus. Also, there is no need for the provision of an extra control circuit, thereby avoiding an increase in the size and cost of the apparatus.

Further, since the above-described changeover switch is provided only for the receiver but not for the transmitter, the apparatus is free from fluctuations in the I. L. caused by changes in the power of a transmitted signal, thereby avoiding deterioration in performance. Further, the transmitted signal does not pass through the switch, which eliminates the need for the use of a switch that has low insertion losses, thereby decreasing the cost of parts. Since the transmitted signal and the received signal are separated by the circulator, it is not necessary to use a switch having high isolation characteristics which is conventionally required. This also contributes to a reduction in the cost of parts. Additionally, the circulator whose port is terminated during transmission serves as an isolator, thereby precluding IM generation by the transmission system and also ensuring stable PA operation without being influenced by load fluctuations.

BRIEF DESCRIPTION OF THE DRAWINGS

FIGS. 2[B], 2[C], 2[D] AND 2[E] show respective examples of components that can be substituted for the ¼-wavelength stripline L4 shown in FIG. 2[A];

DESCRIPTION OF EMBODIMENTS OF THE INVENTION

Embodiments of the present invention will now be described with reference to the accompanying drawings.

Figure 1:
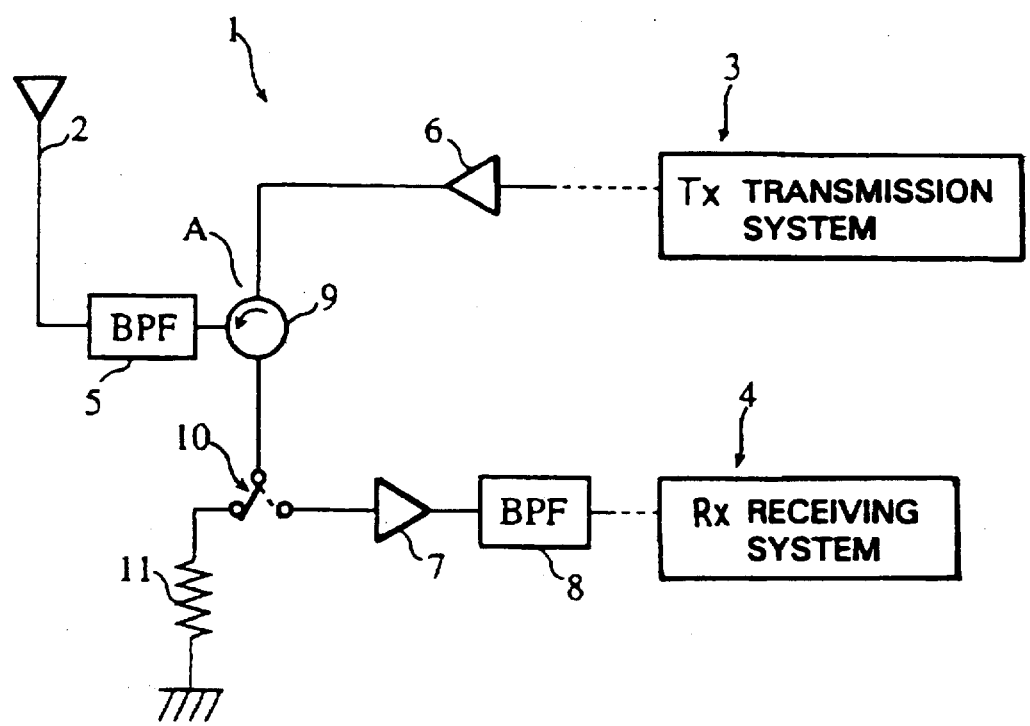
FIG. 1 is a schematic diagram of a transmitting and receiving apparatus according to an embodiment of the present invention.
Figure 2A:
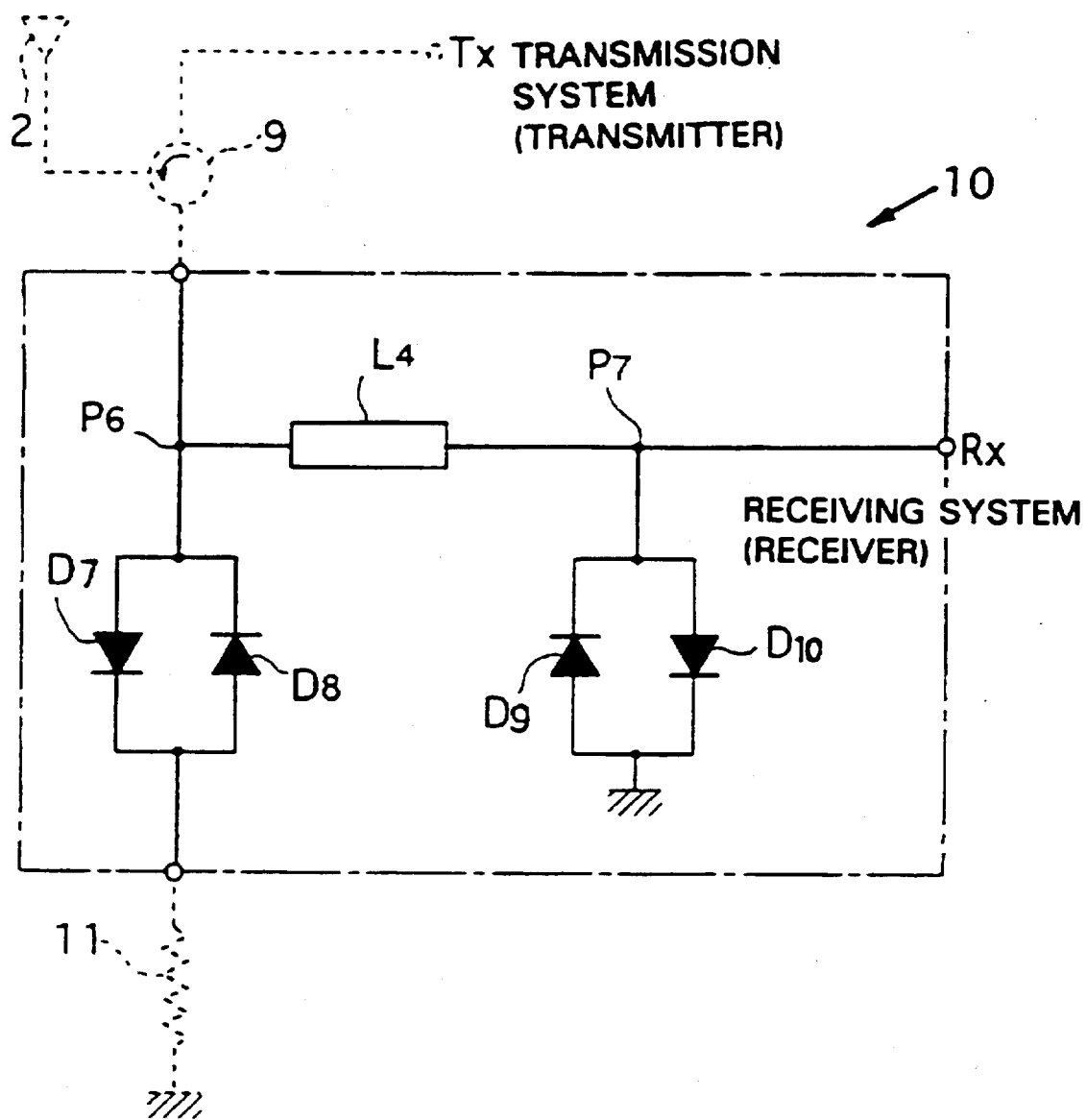
FIG. 2[A] is a circuit diagram of a changeover switch used in the transmitting and receiving apparatus of this embodiment.
Figure 2B:
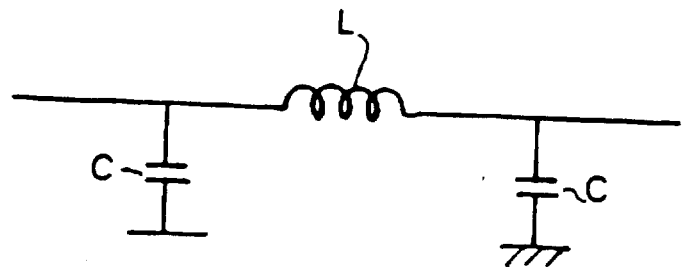
Figure 2C:
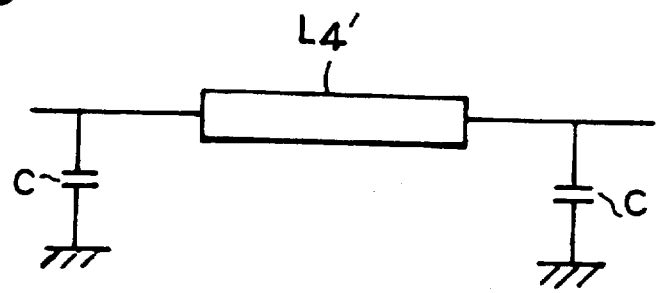
Figure 2D:
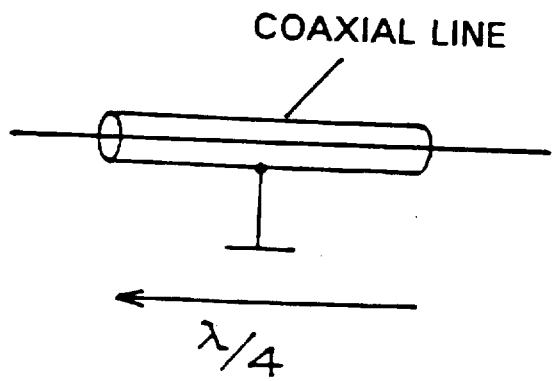
Figure 2E:

FIGS. 1 and 2 illustrate a transmitting and receiving apparatus according to an embodiment of the present invention. More specifically, FIG. 1 is a schematic diagram of the transmitting and receiving apparatus; and FIG. 2 is a circuit diagram of a changeover switch for use in the apparatus according to this embodiment.

In the transmitting and receiving apparatus 1 of this embodiment, a single antenna 2 is shared by a transmitter 3 and a receiver 4 via a circulator 9 disposed at the feed point A of the antenna 2. A band-pass filter 5, connected between the antenna 2 and its feed point A, serves the function of allowing only signals in a predetermined frequency band to pass therethrough and preventing the entry of signals in other frequency bands.

Also, a PA 6 for amplifying transmitted signals is disposed between the transmitter 3 and the feed point A, and a low-noise amplifier (LNA) 7 and a band-pass filter 8 are connected between the receiver 4 and the feed point A. The circulator 9 located at the feed point A serves the function of allowing signals to pass only in the transmitting direction and preventing them from flowing in the reverse direction. A changeover switch 10 intervenes between the circulator 9 and the LNA 7 of the receiver 4, and a terminating resistor 11 is located between one terminal of the switch 10 and ground. When a received signal is inputted, the switch 10 is automatically set to connect the circulator 9 to the receiver 4, and when a transmitted signal is outputted, the switch 10 is automatically set to connect the circulator 9 to the terminating resistor 11 in accordance with the signal voltage.

The above-described changeover switch 10 is configured as shown in FIG. 2[A]. Diodes D7 and D8 are connected in parallel to each other between the circulator 9 and the terminating resistor 11. A ¼-wavelength stripline L4 having characteristic impedance Z0 is connected to a point P6 located between the diodes D7 and D8. Diodes D9 and D10 are connected in parallel to each other between the other end of the stripline L4 and ground. The receiver (Rx system) is connected to a point P7 positioned between the diodes D9 and D10.

As shown in FIG. 2[B], a circuit including an inductor L and two capacitors C can be substituted for the ¼-wavelength stripline L4 shown in FIG. 2[A].

Also, as shown in FIG. 2[C], a circuit including a stripline L4' and two capacitors C can be substituted for the ¼-wavelength stripline L4 shown in FIG. 2[A]. While the diodes D7, D8, D9 and D10 in FIG. 2[A] ideally generate no capacitance, in practice the capacitors will have a junction capacitance. Therefore, it is advantageous to substitute the stripline L4' for the stripline L4, wherein the length or the characteristic impedance of the stripline L4' is different from that of the stripline L4. For example, the characteristic impedance of the stripline L4' may be higher than that of the stripline L4. In such a case, the capacitors C may be provided by the junction capacitances of the first and second pairs of diodes, rather than by separate capacitors as shown.

As shown in FIGS. 2[D] and 2[E], respectively, the stripline L4 can also be replaced by either a ¼-wavelength coaxial line or a Tri-plate stripline.

The operation of the changeover switch 10 will now be explained by its application to a PHS system by way of example. During transmission, a high-frequency signal of approximately 100 mW is outputted from the transmitter 3. It will now be assumed that a high-frequency signal of approximately several dozens of mW flows through the switch 10 via the circulator 9 after the signal has been partially reflected by the antenna 2. By the use of diodes that are turned on at 10 mW as the diodes D7 to D10, it is arranged that one of the diodes D7 and D8 and one of the diodes D9 and D10 are turned on if the high-frequency signal exceeds 10 mW. In this case, a positive voltage turns on the diodes D7 and D9, while a negative voltage turns on the diodes D8 and D10.

At this time, since the point P7 is short-circuited to the ground through either diode D9 or diode D10, the impedance of a portion viewed from the point P6 toward the receiver 4 becomes infinite, thus resulting in this portion being in an open state. Also, the point P6 is connected to the terminating resistor 11 through either diode D7 or diode D8, whereby 10 mW or more signal power is absorbed and dissipated in the resistor 11.

In this fashion, a reflection signal from the antenna 2 does not return to the circulator 9, thus preventing the entry of reflected waves to the transmitter 3. It is also possible to prevent reflected waves from entering the receiver 4, since no signals pass through the switch 10. As a consequence, IM generation and unstable conditions of the PA operation can be prevented.

Further, no diodes are provided for the transmitter 3, which would otherwise produce adverse influences on the apparatus caused by the non-linearity of diodes. This further precludes losses caused by diodes and suppresses fluctuations in the I. L. caused by changes in transmission power.

On the other hand, during a receiving operation, since the power of a received signal is much smaller, approximately several dozens of µW, than the power of a transmitted signal, all the diodes D7 to D10 are turned off. This disconnects the point P6 from the terminating resistor 11 through the diodes D7 and D8 and also disconnects the point P7 from ground through the diodes D9 and D10. Because of this insulation, a receiving signal from the antenna 2 can flow completely into the receiver 4. In the event of an inadvertent entry of a large current during a receiving operation, such a current is absorbed by the switch 10, thereby avoiding an adverse influence on the LNA 7.

Figure 3:
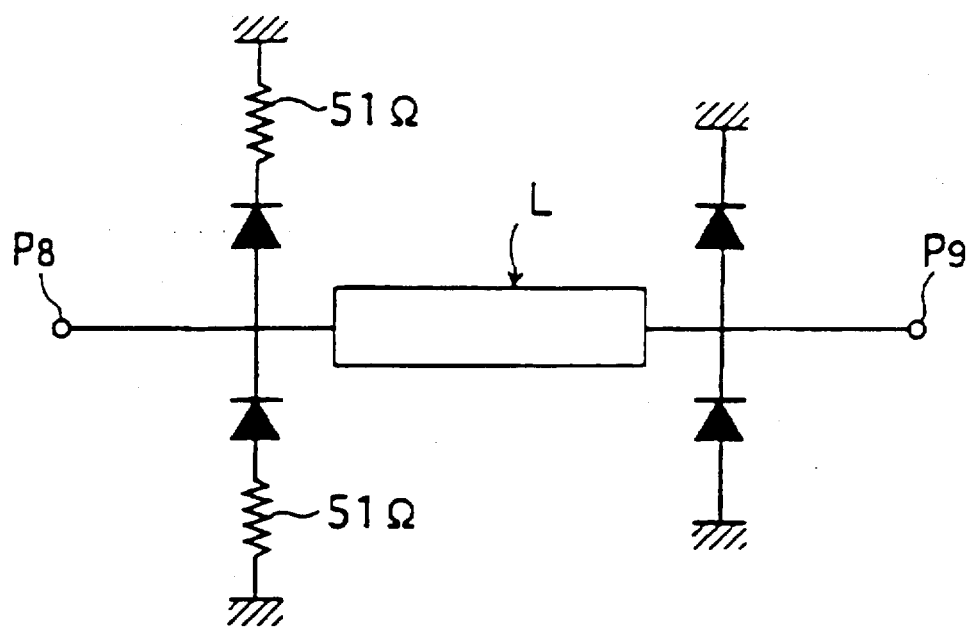
FIG. 3 is a circuit diagram of a changeover switch used in the experiment carried out for ensuring the advantages of this embodiment.
Figure 4:
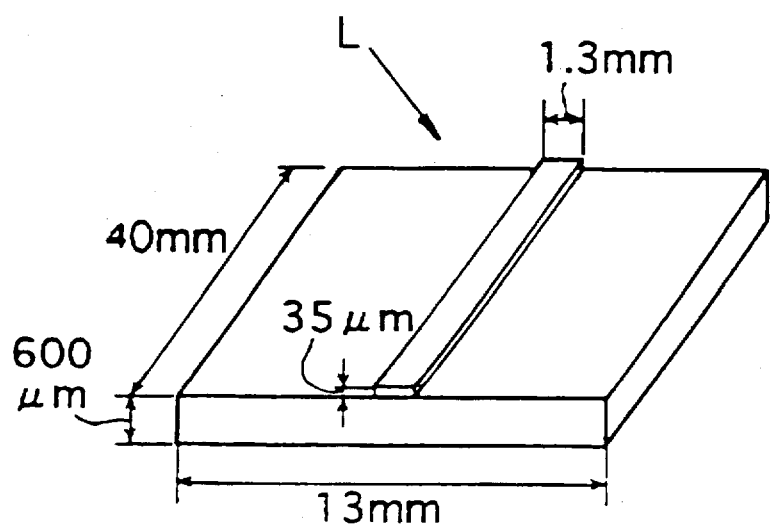
FIG. 4 is a perspective view of a micro-stripline for use in the experiment.

FIG. 3 is a circuit diagram of an alternate embodiment of a changeover switch and FIG. 4 illustrates a micro-stripline, both of these components being used in an experiment carried out for ensuring the advantages of this embodiment. In this experiment, the changeover switch shown in FIG. 3 for use in a 950 MHz frequency band was produced by the use of various types of commercially-available devices, as shown in Table 1. Although the ¼-wavelength of the stripline L is nominally approximately 48 mm at 950 MHz, it was reduced to 40 mm, since the diodes have internal capacitance (see FIG. 4).

TABLE 1

Device List

| Device | Manufacturer | Item of product |
|---|---|---|
| Diode | NEC Corporation | ISS283 |
| Resistor | Rohm Co., Ltd. | MCR03 |
| Micro-stripline | Mitsubishi Gas Chemical Co., Inc. | CCL-HL870 |

Table 2 shows the measurements of electrical characteristics, such as reflection losses (dB) and insertion losses (I. L.) (dB), caused as a result of varying incident power at 950 MHz from 100 µW to 100 mW. The reflection losses indicate reflection characteristics viewed from a point P8 of FIG. 3, and the I. L. designate losses resulting in a portion from point 8 to point 9 of FIG. 3.

TABLE 2

Relationship between incident power and electrical characteristics

| Power | Return loss (dB) | Insertion loss (dB) |
|---|---|---|
| 100 µW | 19.0 | 0.9 |
| 1 mW | 26.1 | 3.0 |
| 10 mW | 19.3 | 5.9 |
| 100 mW | 18.2 | 9.6 |

Figure 5A:
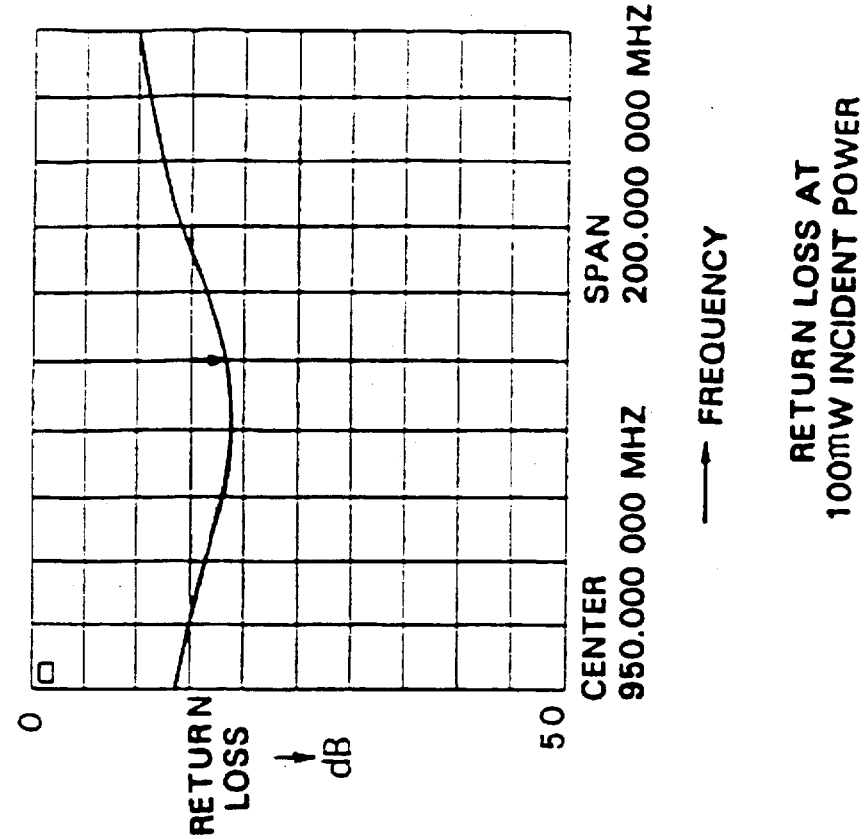
FIGS. 5A&B is a characteristic diagram of reflection losses caused in the experiment.
Figure 5B:
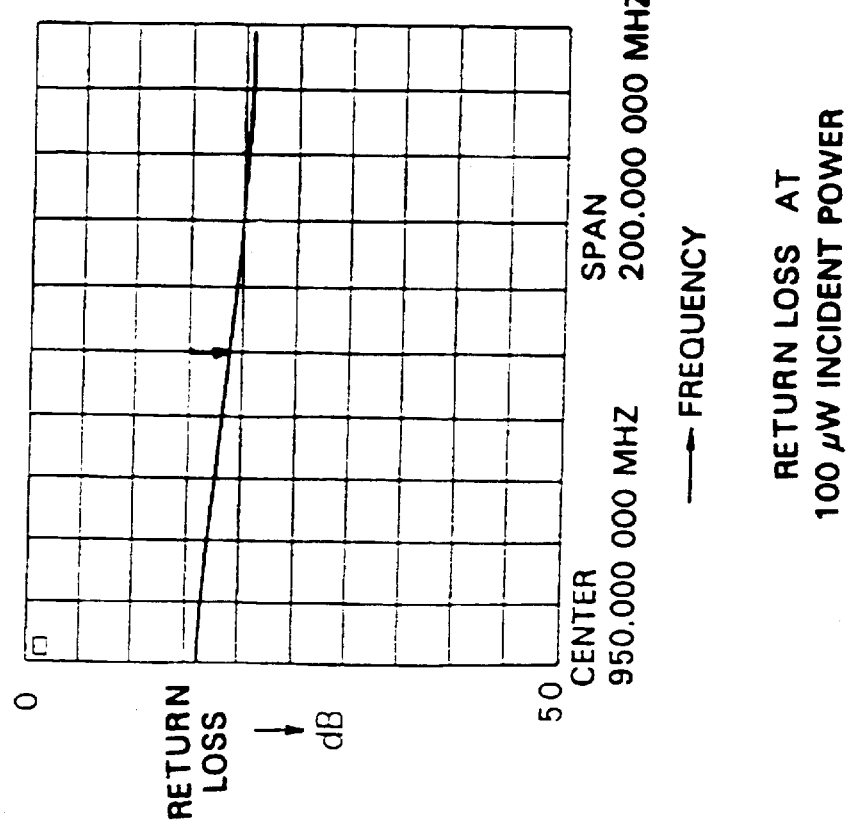
Figure 6A:
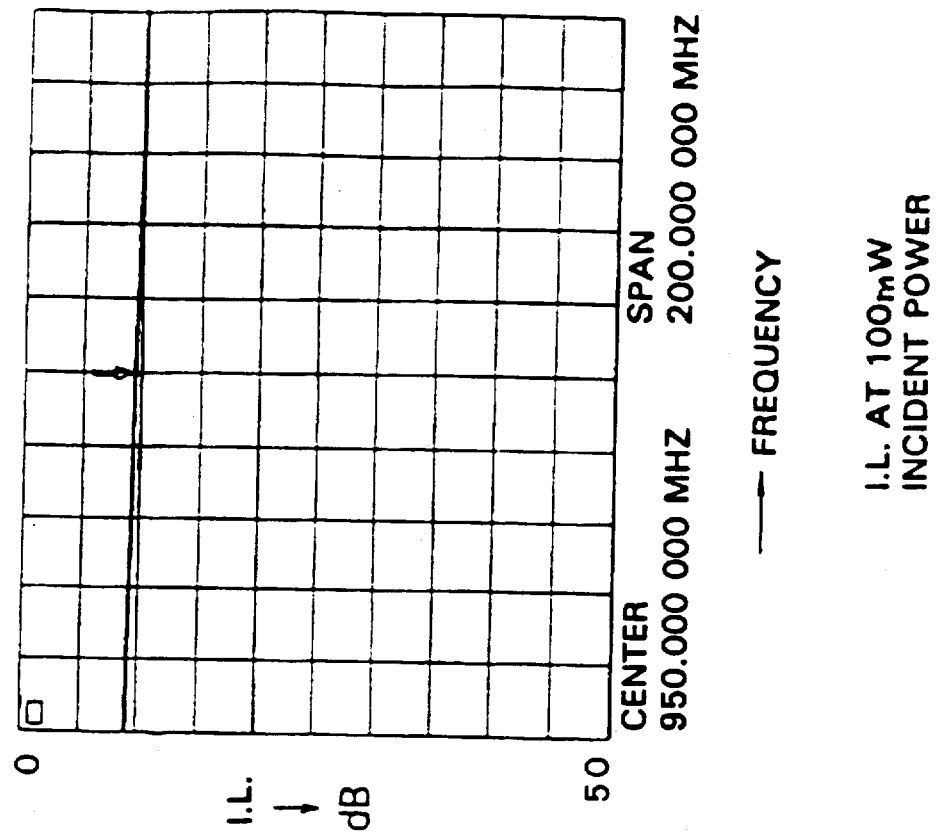
FIGS. 6A&B is a characteristic diagram of insertion losses caused in the experiment.
Figure 6B:
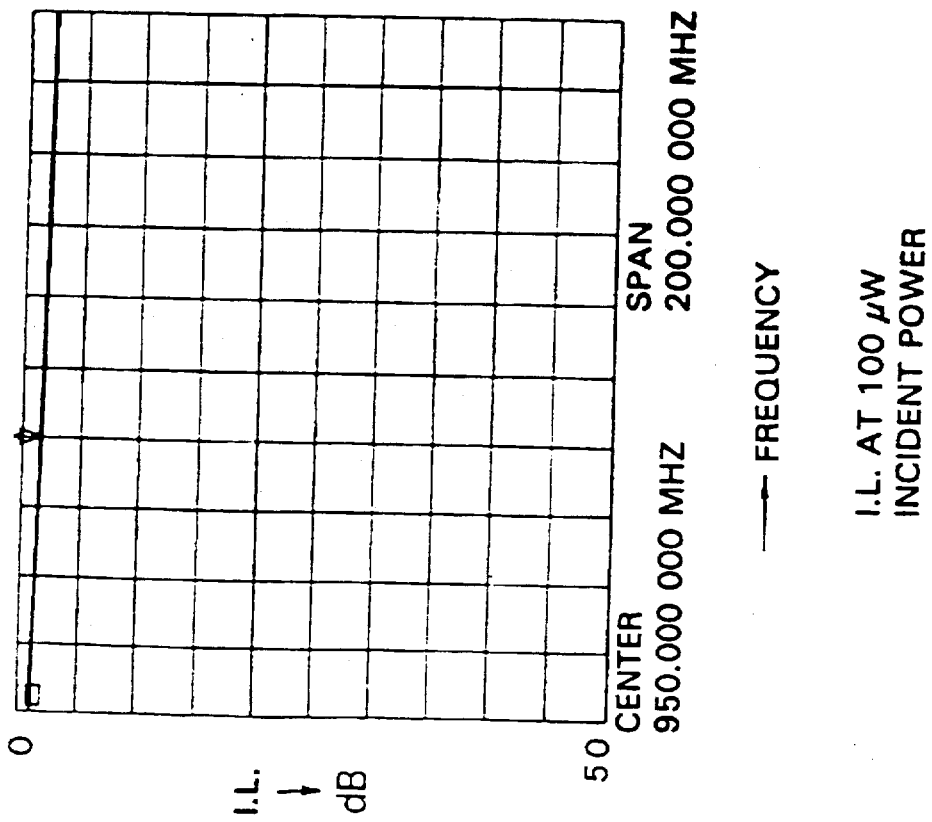
Figure 7:
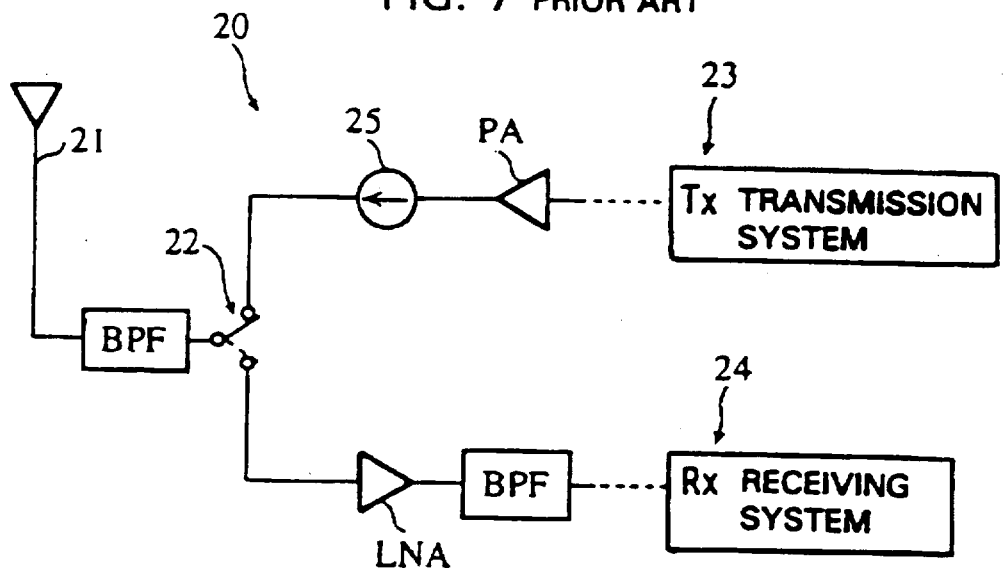
FIG. 7 is a schematic diagram of a conventional transmitting and receiving apparatus.
Figure 8:
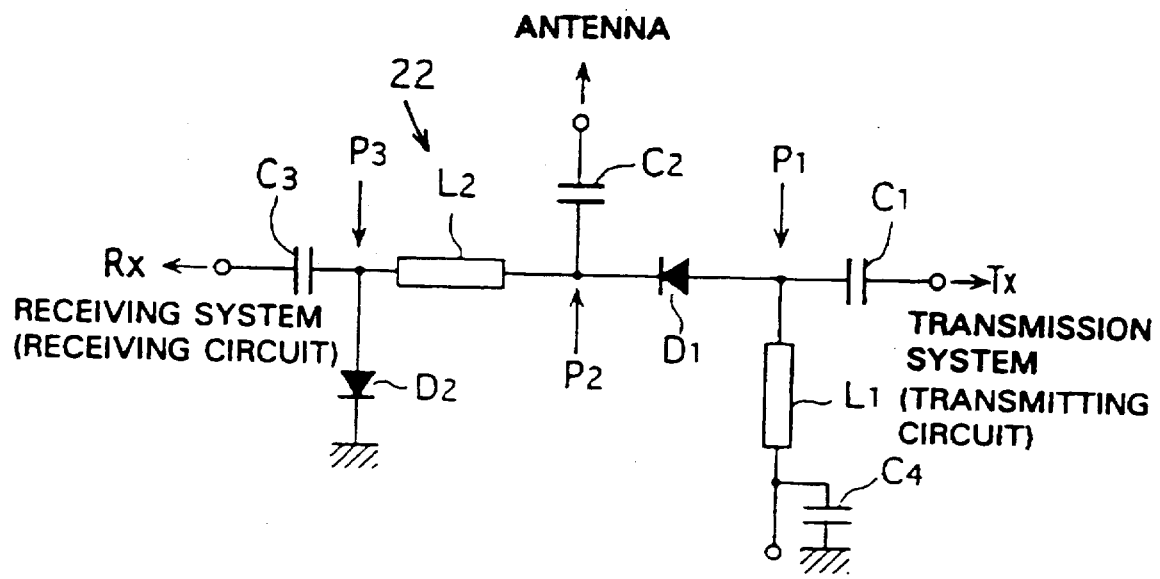
FIG. 8 is a circuit diagram of a conventional changeover switch.
Figure 9:
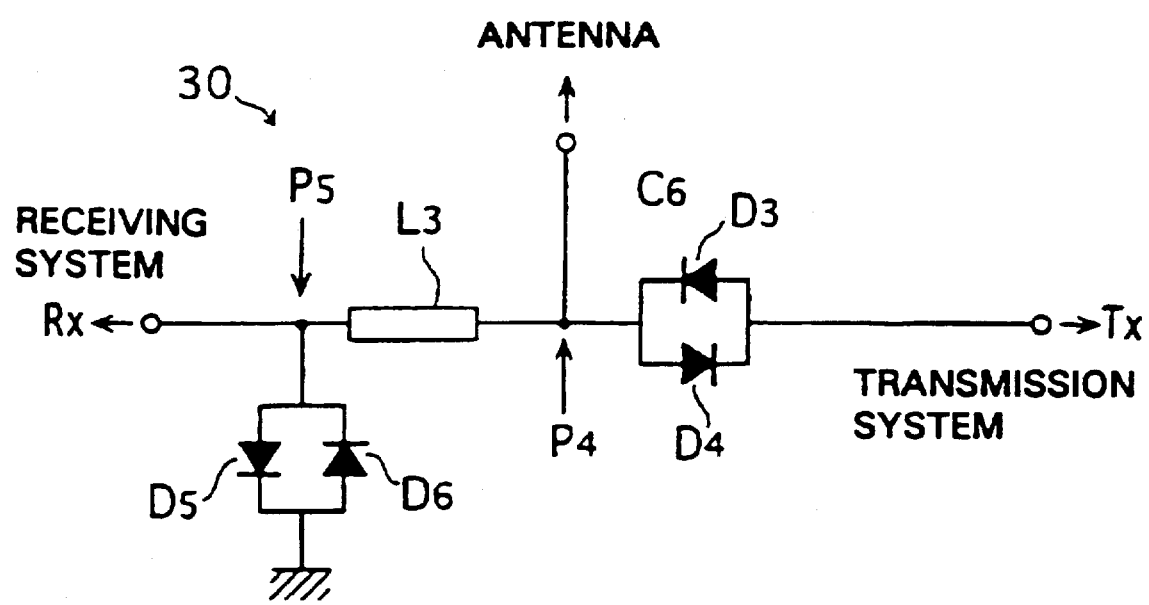
FIG. 9 is a circuit diagram of a changeover switch used for illustrating a process for accomplishing the present invention.

FIGS. 5A and 5B are characteristic diagrams indicating return loss with respect to the incident power 100 µW and 100 mW, respectively. FIGS. 6A and 6B are characteristic diagrams designating the I. L. (insertion loss) with respect to the incident power 100 µW and 100 mW, respectively. As is clearly seen from Table 2 and FIGS. 5A to 6B, the return loss with respect to various frequencies is 18 dB or greater in response to a change of the incident power from 100 µW and 100 mW when the receiving power is 100 µW and the transmission power is 100 mW. This indicates that a signal reflected from the antenna is too weak to flow into the transmitter, thereby preventing IM generation and unstable PA operations. On the other hand, a received signal passes through the switch with the I. L. of 0.9 dB and further passes through the LNA and BPF, followed by finally flowing into the receiver. Since the received signal is amplified in the LNA, the above-mentioned I. L. do not present any substantial problem.

With the I. L. of approximately 10 dB during transmission, approximately 10 mW power out of 100 mW transmission power is sent to the LNA. Thus, by the application of an LNA having standards of 10 mW, unstable operations caused by load fluctuations can be avoided.

As has been discussed above, according to this embodiment, the circulator 9 is disposed at the feed point A of the antenna 2, and also, the changeover switch 10 is provided between the circulator 9 and the receiver 4 to perform an automatic switching operation in accordance with transmission power. This obviates the need for the provision of a battery for switching a current and a current control circuit, as has been conventionally required, thereby improving the power efficiency of the overall transmitting and receiving apparatus and also enhancing the reliability in its performance, as well as avoiding an increase in the size and costs of the apparatus.

Further, since the above-described changeover switch 10 is not provided for the transmitter, the apparatus is free from fluctuations in the I. L. caused by a change in power of a transmitted signal, which further avoids deterioration in performance. Further, the transmitted signal does not pass through the switch 10, which eliminates the need for a switch especially designed to suppress insertion losses to a low level, thereby decreasing the cost of parts. Since the transmitted signal and the received signal are separated by the circulator 9, it is not necessary to use a switch having high isolation characteristics, as has been conventionally required. This also contributes to a reduction in the cost of parts, thereby meeting a demand for lower prices of the apparatus. Additionally, the circulator 9 serves as an isolator during transmission, thereby precluding IM generation in the transmission system and ensuring stable PA operations without being influenced by load fluctuations.

As will be clearly understood from the foregoing description, the transmitting and receiving apparatus of the present invention offers the following advantages. A circulator is provided at the feed point of the antenna, and a changeover switch is disposed between the terminating resistor and the point of connection between the circulator and the receiver so that it can be automatically switched to the resistor in response to power inputted from the transmitter during transmission. Hence, fluctuations in the I. L. caused by a change in transmission power can be prevented without requiring the provision of a battery and a current control circuit for providing a switching current. It is also possible to suppress losses of the transmission system and improve the power efficiency, as well as to decrease the cost of parts.

What is claimed is:

1. A transmitting and receiving apparatus for allowing a transmitter and a receiver to share a single antenna, comprising:

a circulator having a first port for being connected to said transmitter and a second port for being connected to said antenna;

a changeover switch receiving its input from a third port of said circulator;

said changeover switch having a first output for being connected to said receiver, and a second output for being connected to a terminating resistor, said terminating resistor being provided between said second output and ground; and said changeover switch being automatically changeable to connect said circulator to said terminating resistor;

said changeover switch connecting said circulator to said terminating resistor in response to a level of input power of a signal reflected by said antenna during transmission.

2. The apparatus as recited in claim 1, wherein said changeover switch has a quarter-wavelength microstripline connected between said input and said first output, a first pair of diodes connected in parallel in opposite directions between said input and said terminating resistor, and a second pair of diodes connected in parallel in opposite directions between said first output and ground.

3. An apparatus as recited in claim 1, wherein said changeover switch has an impedance circuit connected between said input and said first output, a first pair of diodes connected in parallel in opposite directions between said input and said terminating resistor, and a second pair of diodes connected in parallel in opposite directions between said first output and ground.

4. A transmitting and receiving apparatus for allowing a transmitter and a receiver to share a single antenna, comprising:

a circulator having a first port for being connected to said transmitter and a second port for being connected to said antenna;

a changeover switch receiving its input from a third port of said circulator;

said changeover switch having a first output for being connected to said receiver, and a second output for being connected to a terminating resistor, said terminating resistor being provided between said second output and ground; and said changeover switch being automatically changeable to connect said circulator to said terminating resistor in response to a level of input power supplied to said changeover switch from said transmitter during transmission;

wherein said changeover switch has a quarter-wavelength microstripline connected between said input and said first output, a first pair of diodes connected in parallel in opposite directions between said input and said terminating resistor, and a second pair of diodes connected in parallel in opposite directions between said first output and ground.

5. An apparatus as recited in claim 4, wherein said changeover switch connects said circulator to said terminating resistor in response to a level of input power of a signal reflected by said antenna during transmission.

6. A transmitting and receiving apparatus for allowing a transmitter and a receiver to share a single antenna, comprising:

a circulator having a first port for being connected to said transmitter and a second port for being connected to said antenna;

a changeover switch receiving its input from a third port of said circulator;

said changeover switch having a first output for being connected to said receiver, and a second output connected to a terminating resistor, said terminating resistor being provided between said second output and ground; and said changeover switch being automatically changeable to connect said circulator to said terminating resistor in response to a level of input power supplied to said changeover switch from said transmitter during transmission;

said changeover switch further comprising a second terminating resistor, and a third output for being connected to said second terminating resistor;

wherein said changeover switch has a quarter-wavelength microstripline connected between said input and said first output, a first diode connected in conducting direction between said input and said second output, a second diode connected in non-conducting direction between said input and said third output, a third diode connected in conducting direction between said first output and ground, and a fourth diode connected in non-conducting direction between said first output and ground.

7. An apparatus as recited in claim 6, wherein said changeover switch connects said circulator to said terminating resistor in response to a level of input power of a signal reflected by said antenna during transmission.

8. A transmitting and receiving apparatus for allowing a transmitter and a receiver to share a single antenna, comprising:

a circulator having a first port for being connected to said transmitter and a second port for being connected to said antenna;

a changeover switch receiving its input from a third port of said circulator;

said changeover switch having a first output for being connected to said receiver, and a second output for being connected to a terminating resistor, said terminating resistor being provided between said second output and ground; and said changeover switch being automatically changeable to connect said circulator to said terminating resistor in response to a level of input power supplied to said changeover switch from said transmitter during transmission;

wherein said changeover switch has an impedance circuit connected between said input and said first output, a first pair of diodes connected in parallel in opposite directions between said input and said terminating resistor, and a second pair of diodes connected in parallel in opposite directions between said first output and ground.

9. An apparatus as recited in claim 8, wherein said changeover switch connects said circulator to said terminating resistor in response to a level of input power of a signal reflected by said antenna during transmission.

10. An apparatus as recited in claim 1, wherein said impedance circuit comprises a Triplate stripline.

11. An apparatus as recited in claim 8, wherein said impedance circuit comprises a coaxial line.

12. An apparatus as recited in claim 11, wherein said coaxial line is a quarter-wavelength line.

13. An apparatus as recited in claim 8, wherein said impedance circuit is a π-circuit.

14. An apparatus as recited in claim 13, wherein said π-circuit comprises an inductance having two ends, and a pair of capacitances respectively connecting said two ends to ground.

15. An apparatus as recited in claim 14, wherein said two capacitances are provided respectively by junction capacitances of said first and second pairs of diodes.

16. An apparatus as recited in claim 13, wherein said π-circuit comprises a microstripline whose wavelength is unequal to a quarter-wavelength, having two ends, and a pair of capacitances respectively connecting said two ends to ground.

17. An apparatus as recited in claim 16, wherein said two capacitances are provided respectively by junction capacitances of said first and second pairs of diodes.

18. An apparatus as recited in claim 13, wherein said π-circuit comprises a microstripline whose impedance is unequal to the impedance of a quarter-wavelength microstripline, having two ends, and a pair of capacitances respectively connecting said two ends to ground.

19. An apparatus as recited in claim 18, wherein said impedance of said microstripline is higher than the impedance of a quarter-wavelength microstripline.

20. An apparatus as recited in claim 19, wherein said two capacitances are provided respectively by junction capacitances of said first and second pairs of diodes.

21. An apparatus as recited in claim 18, wherein said two capacitances are provided respectively by junction capacitances of said first and second pairs of diodes.

* * * * *